(12) United States Patent
Izikoff (10) Patent No.: US 8,495,914 B2
(45) Date of Patent: Jul. 30, 2013

(54) HANDHELD ULTRASOUND DETECTION APPARATUS HAVING A FLEXIBLE TUBE

(75) Inventor: Myles Izikoff, Hendersonville, TN (US)

(73) Assignee: Discovery Sound Technology LLC, Nashville, TN (US)

( * ) Notice: Subject to any disclaimer, the term of this patent is extended or adjusted under 35 U.S.C. 154(b) by 368 days.

(21) Appl. No.: 12/847,629

(22) Filed: Jul. 30, 2010

(65) Prior Publication Data

US 2011/0023585 A1    Feb. 3, 2011

Related U.S. Application Data

(60) Provisional application No. 61/273,065, filed on Jul. 30, 2009.

(51) Int. Cl.
*G01N 29/14* (2006.01)
*G01N 29/28* (2006.01)
*G01M 3/24* (2006.01)

(52) U.S. Cl.
USPC .............................. 73/601; 73/40.5 A; 73/587

(58) Field of Classification Search
USPC ............... 73/587, 40.5 A, 601, 617, 642, 644
See application file for complete search history.

(56) References Cited

U.S. PATENT DOCUMENTS

| | | | | |
|---|---|---|---|---|
| 4,987,769 A * | 1/1991 | Peacock et al. | ................. | 73/49.7 |
| 5,445,026 A * | 8/1995 | Eagan | .............................. | 73/591 |
| 5,710,377 A * | 1/1998 | Youngquist et al. | ............. | 73/584 |
| 5,854,422 A * | 12/1998 | McKeon et al. | ................ | 73/49.2 |
| 6,058,076 A * | 5/2000 | Komninos | ..................... | 367/135 |
| 6,247,353 B1 * | 6/2001 | Battenberg et al. | ......... | 73/40.5 A |
| 6,766,692 B1 * | 7/2004 | Eagan | .............................. | 73/587 |
| 6,978,675 B2 * | 12/2005 | Eagan | .............................. | 73/587 |
| 2005/0126264 A1 * | 6/2005 | Komninos | .................. | 73/40.5 A |
| 2010/0097057 A1 * | 4/2010 | Karpen | ........................... | 324/238 |

\* cited by examiner

*Primary Examiner* — Peter Macchiarolo
*Assistant Examiner* — Rose M Miller
(74) *Attorney, Agent, or Firm* — Waddey & Patterson, P.C.; Lucian Wayne Beavers; Gary L. Montle (57) ABSTRACT

A handheld ultrasound detection apparatus of the present disclosure has a housing comprising a display device and a flexible tube attached at its distal end to the housing, the flexible tube housing an ultrasound receiver for receiving ultrasound energy and converting the ultrasound energy into an electronic signal. The handheld ultrasound detection apparatus further has logic configured to receive the electronic signal and convert the electronic signal to digital data, the logic further configured to display data indicative of the digital data to the display device.

12 Claims, 10 Drawing Sheets

HANDHELD ULTRASOUND DETECTION APPARATUS HAVING A FLEXIBLE TUBE

CROSS REFERENCE TO RELATED APPLICATIONS

This application claims priority to U.S. Provisional Patent Application Ser. No. 61/273,065, entitled "System and Method for Leak Detection," and filed on Jul. 30, 2009, which is incorporated herein by reference.

BACKGROUND

Ultrasound is acoustic energy in the form of sound waves. Ultrasound exhibits a frequency above the human hearing range. In this regard, the highest frequency that the human ear can detect is around twenty thousand Hertz (or 20,000 cycles per second).

DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure is best understood by referring to the drawings. The elements of the drawings are not necessarily to scale, emphasis instead being placed upon clearly illustrating the principles of the disclosure.

Oftentimes in particular environments, such as manufacturing environments, there are various incidents that may occur that the human ear cannot detect but that may be detectable by an ultrasound device. In this regard, leaks in pipes may emit ultrasound energy. In addition, electrical problems, for example corona discharge in an electrical box, may emit ultrasound energy that can be detected by an ultrasound device.

Thus, problems may be realized and averted by detection of ultrasound being emitted in a variety of situations. For example, a small leak in a pipe may not be detectable through use of the human ear, but by detection of ultrasound being emitted by the leak the leaky pipe can be addressed prior to the eventuality of a major leak. As another example, an electrical box may be experiencing problems that are undetectable by the human ear or by sight by detection of the ultrasound energy that is escaping when the corona discharge occurs. Thus, the electrical problem can be addressed prior to the eventuality of a major electrical outage.

The present disclosure relates to a handheld ultrasound detection apparatus that can be used in environments, such as manufacturing environments, for detecting ultrasound energy that is undetectable by the human ear. The handheld ultrasound detection apparatus can be used in wide mode, where a wide range of ultrasound energy is detectable, or the handheld ultrasound detection apparatus can be used in narrow mode for pinpointing the exact location of the source of ultrasound emissions without consequence related to any ultrasound energy that can be considered "noise."

The handheld ultrasound detection apparatus comprises a display device. The display device is for communicating to a user of the handheld ultrasound detection apparatus of characteristics of the ultrasound energy that is detected by the handheld ultrasound apparatus.

Further, the handheld ultrasound detection apparatus comprises a flexible tube that attaches onto the housing of the handheld ultrasound detection apparatus. The flexible tube allows the user to maneuver around corners, beams, pipes, or the like, to better obtain an ultrasound reading of a potential source of ultrasound energy.

Figure 1:
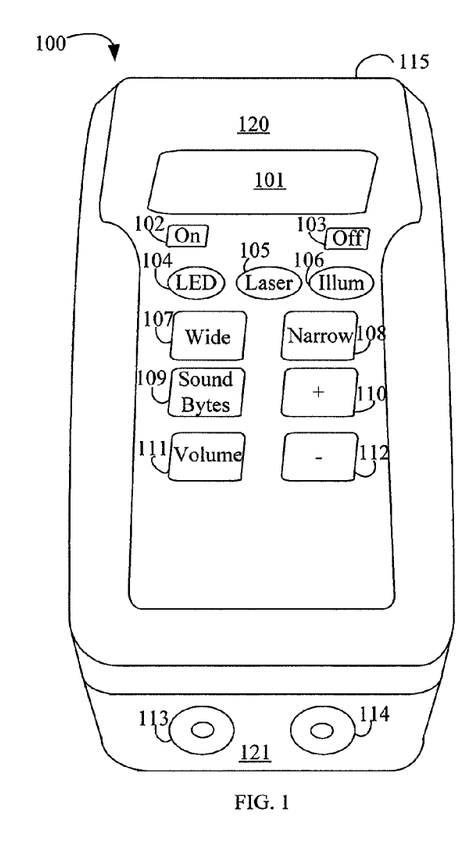
FIG. 1 is a back side perspective view of an exemplary handheld ultrasound detection apparatus in accordance with an embodiment of the present disclosure, showing the bottom of the apparatus.

FIG. 1 is a front side perspective view of a handheld ultrasound detection apparatus 100 in accordance with an embodiment of the present disclosure. The handheld ultrasound detection apparatus 100 comprises a housing 115 that houses electronic components described further herein with reference to FIG. 3.

The handheld ultrasound detection apparatus 100 further comprises a front side 120 comprising a display device 101, which can be, for example, a light emitting diode (LED) display device or a liquid crystal display (LCD) device. During operation, the display device 101 displays information relative to operation of the handheld ultrasound detection apparatus 100.

The handheld ultrasound detection apparatus 100 further comprises a plurality of control buttons 102-112. In particular, the handheld ultrasound detection apparatus 100 comprises an "On" button 102 and an "Off" button 103 for activating and deactivating the handheld ultrasound detection apparatus 100. In addition, the handheld ultrasound detection apparatus 100 further comprises an "LED" button 104 for activating the display device 101, a "Laser" button 105 and an "Illum" button 106, which are described further with reference to FIG. 2.

The handheld ultrasound detection apparatus 100 also comprises a "Wide" button 107 that when selected relatively increases the listening area of the handheld ultrasound detection apparatus 100. In addition, the handheld ultrasound detection apparatus 100 comprises a "Narrow" button 108 that when selected decreases the listening area of the handheld ultrasound detection apparatus 100. Actuating the Wide button 107 causes the apparatus to operate in the normal field of reception and is generally in the 40K hertz spectrum. When the Narrow field button 108 is selected, the apparatus 100 narrows the field of reception which reduces or eliminates competing noise. In this regard, a user (not shown) may use the apparatus 100 with the Wide button 107 actuated to narrow in on a potential leak location, and then select the Narrow button 108 to narrow the field and amplify the signal.

In one embodiment of the apparatus 100, the Narrow mode setting narrows the reception spectrum down to around 38.4 kilohertz (kHZ), plus or minus 1 kHz. In this regard, the apparatus 100 contains an 8-pole filter (not shown), that narrows the spectrum accordingly. When the apparatus 100 is in Wide mode, the 8-pole filter is bypassed so that a receiver 200 (FIG. 2) in the apparatus 100 receives all of the signals that the receiver 200 in the apparatus is capable of receiving. The receiver 200 generally receives signals at 40 kilohertz, plus or minus 2 kilohertz; therefore a wider range of signals is received when the apparatus 100 is in Wide mode.

Note that while the central frequency of 38.4 kHZ+/−1 kHz is described as the reception spectrum when the handheld ultrasound detection apparatus is in narrow mode, other central frequencies and band sizes are possible in other embodiments. Further note that while the central frequency of 40 kHz+/−2 kHz is described as the reception spectrum when the handheld ultrasound detection apparatus is in wide mode, other central frequencies and band sizes are possible in other embodiments.

The display device 101 displays the current field setting (i.e., Wide or Narrow). The display device 101 further displays signal intensity bars (not shown) that graphically reflect the intensity of the signal being received. Other types of field setting can possibly be displayed to the display device in other embodiments of the present disclosure.

The handheld ultrasound detection apparatus 100 further comprises a back end 121 comprising a plurality of ports 113 and 114 for receiving one or more listening devices (not shown). For example, headphones or earphones may be connected to the ports 113 and 114. A user holding the apparatus 100 can then hear sounds received and/or generated by the apparatus 100, which is described further herein.

The apparatus 100 further comprises a "Sound Bytes" button 109. In one embodiment, when the "Sound Bytes" button 109 is selected, the apparatus 100 transmits training sounds to the ports 113 and 114 for hearing by a user using the listening devices. In this regard, the apparatus 100 may display a list of sounds available for hearing that includes, for example, sounds of corona discharge or sounds of an air leak. Using a "+" button 110 and a "−" button 112, the user can scroll through the list of available sounds and select a sound from the list that the user desires to hear. Upon selection, the apparatus 100 generates sound indicative of, for example, a corona discharge or an air leak, and plays the sound for the user via the listening devices connected to the ports 113 and 114. The "Volume" button 111 can be used to increase and/or decrease the volume at which the user hears generated sounds.

Figure 2:
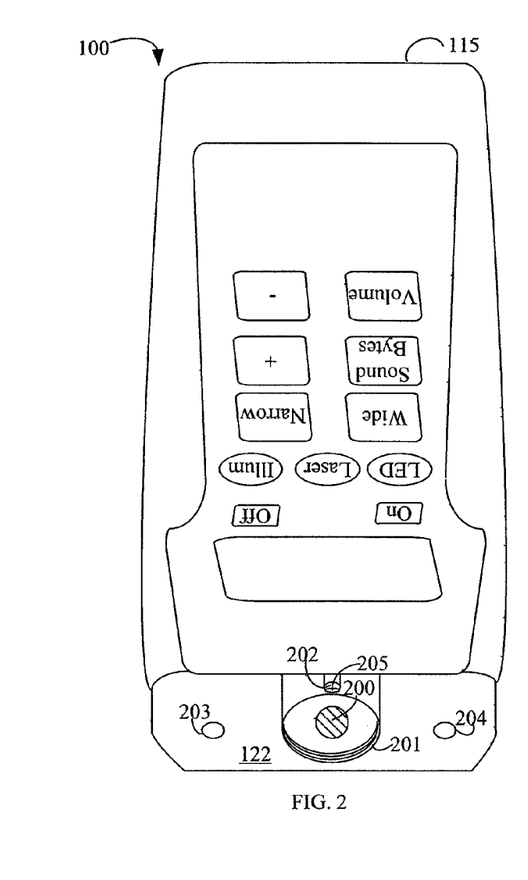
FIG. 2 is a front side perspective view of the handheld ultrasound detection apparatus, such as is depicted in FIG. 1.

FIG. 2 is a front end perspective view of the handheld ultrasound detection apparatus 100 showing a front end 122 of the apparatus 100. Notably, the front end 122 comprises the ultrasound receiver 200 embedded within a threaded cylindrical structure 201. The structure 201 is threaded for receiving receiver heads (not shown) that enable directed use of the receiver 200, and the implements are described further herein with reference to FIG. 5. In one embodiment, the receiver 200 is recessed within the structure 201; however, the receiver 200 may be located differently in other embodiments of the apparatus 100.

The handheld ultrasound detection apparatus 100 further comprises a laser 202 and a plurality of lighting devices 203 and 204, which can be light emitting diodes (LED), for example. During operation, the user can select the "Illum" button 106, which activates the lighting devices 203 and 204. Therefore, when the apparatus 100 is being used in a dimly lit environment, e.g., in an electrical panel when determining corona discharge, the lighting devices 203 and 204 illuminate the field of view.

When the "Laser" button 105 is activated, the laser 202 emits a laser beam pulse in a direction in which the front end 122 of the apparatus 100 is being pointed. In this regard, the laser beam pulse is emitted from the laser 202 in the same direction in which the front end 122 of the ultrasound receiver 200 is directed. Thus, the beam (not shown) emitted from the laser 202 falls approximately on an object (not shown) in the direction in which the receiver 202 is listening. Therefore, the laser 202 approximately "points" to the object that is being listened to by the receiver 202.

The apparatus further comprises a detector 205. The detector 205 receives light from the laser 202 that is reflected off an object at which the laser 202 is pointing. Such reflected light can be used to determine, based upon the distance traveled by light emitted from the laser 202, the distance of an object from the apparatus 100. This distance can be displayed to the display device 101.

In another embodiment, the detector 205 is an infrared sensor. In such an embodiment, the detector 205 may be used to determine the temperature of an object that is being pointed to by the laser 202.

Figure 3:
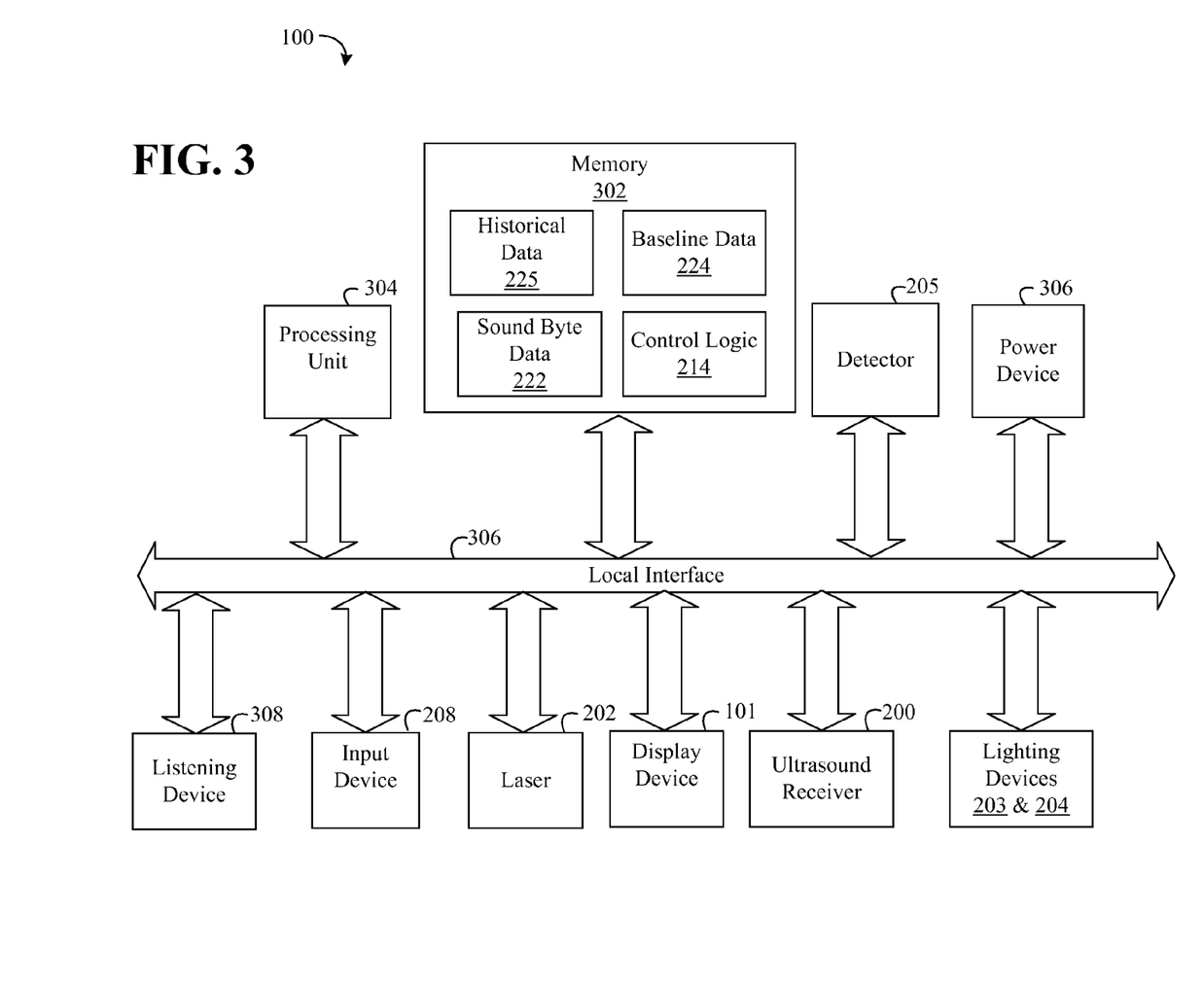
FIG. 3 is a block diagram depicting exemplary system components of the handheld ultrasound detection apparatus depicted in FIG. 1.

FIG. 3 is a block diagram of an exemplary apparatus 100 of the present disclosure. The exemplary apparatus 100 generally comprises the ultrasound receiver 200, the lighting devices 203 and 204, and the display device 101, as described hereinabove with reference to FIGS. 1 and 2. In addition, the apparatus 100 further comprises a processing unit 304, a listening device 308, an input device 208, a detector 205, a laser 202, and a power device 306 all communicating over a local interface 306.

In one embodiment, the input device 208 comprises a keypad having the plurality of buttons 102-112 (FIGS. 1 and 2). Other input devices 208 are possible in other embodiments.

In one embodiment, the listening device 208 comprises at least one headphone and/or earphone, which connect to the ports 113 and 114 (FIG. 1). Other listening devices 208 are possible in other embodiments. For example, the apparatus 100 may further comprise a radio transmitter that wirelessly transmits data to wireless receivers worn by a user (not shown).

The apparatus 100 further comprises a power device 306 for providing electrical power to other components of the handheld ultrasound detection apparatus 100. The power device 306 may be, for example, a rechargeable battery pack that powers the components of the handheld ultrasound detection apparatus 100.

The apparatus 100 further comprises control logic 214. The control logic 214 can be software, hardware, or a combination thereof. In the exemplary apparatus 100, the control logic 214 is shown as software stored in memory 302. The memory 302 may be of any suitable type of computer memory known in the art, such as RAM, ROM, flash-type, and the like.

As noted herein, the control logic 214 is shown in FIG. 3 as software stored in memory 302. When stored in memory 302, the control logic 214 can be stored and transported on any computer-readable medium for use by or in connection with an instruction execution system that can fetch and execute the instructions. In the context of this document, a "computer-readable medium" can be any means that can contain or store the program for use by or in connection with an instruction execution apparatus. The computer readable medium can be, for example but not limited to, an electronic, magnetic, optical, electromagnetic, infrared, or semiconductor device.

The processing unit 304 may be a digital processor or other type of circuitry configured to run the control logic 214 by processing and executing the instructions of the control logic 214. The processing unit 304 communicates to and drives the other elements within the apparatus 100 via the local interface 306, which can include one or more buses.

During operation, the user activates the apparatus 100 via the input device 208, which can comprise any of the plurality of buttons 102-112 (FIGS. 1 and 2). Upon activation, the control logic 214 calibrates the receiver 202 based upon baseline data 224 stored in memory 302. When the user activates the "Wide" button 107, the control logic 214 listens, via the receiver 202, for ultrasound signals in the 40K Hertz signal band within a tolerance of +/−2 kHz.

The control logic 214 displays to the display device 101 data indicating the percentage of saturation of the electronics with a sound signal received by the receiver 202. When the user selects the "Narrow" button 108, the control logic 214 listens, via the receiver 202, for ultrasound signals in the 38.4 kHz signal band within a tolerance of +/−1 kHz.

The control logic 214 then applies a gain to the signals such that the signals are then within an audible range of around 20 kHz. Thus, the signals being received via the receiver 202 are transmitted to the listening device 208 so that the user can recognize whether there is a recognizable sound, e.g., a corona discharge or an air leak.

When the user activates the "Sound Byte" button 109 (FIG. 1), the control logic 214 displays a list of identifiers identifying sound byte data 222 stored in memory 302. As an example, the sound byte data 222 may be a plurality of .wav files indicative of pre-recorded sounds common, for example, in an automotive plant. The user can select to hear one of the sounds, e.g., the stored sound of a corona discharge, via the input device 208. The control logic 214 plays the selected sound for the user via the listening device 308.

The control logic 214 may further store historical data 225 indicative of particular tests that have been performed on an identified object. For example, the data 225 may indicate that a test has been performed on a pipe identified as "Pipe 1." The historical data 225 can store the identifier Pipe 1 associated with an ultrasound reading taken from the receiver 202 and data indicative of how far away the reading was taken. Thereafter, the user can return to the same Pipe 1 and, based upon the previously generated data, take another reading at the same distance to determine if a detected leak has increased or changed.

As another example, the apparatus 100 may be used to capture sound and temperature data (not shown) related to a particular bearing. In this regard, the user may obtain data indicative of a sound reading from the receiver 202 and a temperature reading from the detector 205. This data may be stored as historical data 225. In the future, the user can recall the historical data 225 and compare it with a new sound reading and temperature reading to determine if the bearing has degenerated.

Further, the control logic 214 controls the emission of light from the laser 202 when the "Laser" button 105 (FIG. 1) is selected. In this regard, the control logic 214 initiates a laser light pulse from the laser 202. The light pulse emitted from the laser 202 travels to an object and is reflected off the object at which the apparatus 100 is pointed. The detector 205 receives the reflected light pulse, and the control logic 214 determines the distance from the apparatus 100 to the object by measuring the time delay between transmission of the light pulse and detection of the reflected signal.

Additionally, the control logic 214 further initiates and controls the calibration of the apparatus 100. In operation, the apparatus 100 calibrates itself based upon the signal received by the receiver 200 (FIG. 2). In this regard, when the apparatus first boots up, the calibration routine goes through each of four gain ranges bypassing the receiver and collects information about the direct current (DC) in each gain range. In this process, the "noise floor" in each gain range is obtained and recorded when no ultrasound energy is being received by the receiver 200, i.e., the receiver is deactivated. Such noise is that noise produced by the electronics in the device alone regardless of any ultrasound energy that may be being detected by the receiver, i.e., upon calibration the receiver is bypassed. After the calibration sequence is complete, the receiver 200 is put back online and the noise floor values are subtracted out for each range when a ultrasound waves are received by the receiver 200.

The highest gain range employs the use of a high gain circuit that amplifies the output signal of the receiver 200. In one embodiment, the input signal is amplified 40,000 times, but other amounts of amplification are possible in other embodiments. Signals received on the low end of the ultrasound spectrum are as small as 0.3 micro volts (mV) and thus require high amplification in order to be able to translate the signal into the audible range. When this high gain is used in circuits, the circuits tend to drift with temperature and time and the like. When the gain is very high, even small deviations in temperature can result in a large offset in the circuitry. Signals may be varied by as much as a million to one on the high end, and this much gain would likely saturate all of the electronics. Therefore, the signal is attenuated automatically based upon its size. For example, if the incoming signal is too big for a gain range, the signal is automatically attenuated until the signal is just large enough so that it is in a linear range. If it is too small, gain is added automatically and the signal is raised up as far as possible without over-ranging. In other words, the amplification of the signal is controlled such that the output is in a predefined range.

In this regard, control logic 214 directs a signal through the appropriate amplifiers based upon the size of the signal. The signal is maintained into a linear range of the amplifiers to avoid introducing harmonics into the signal.

Figure 4:
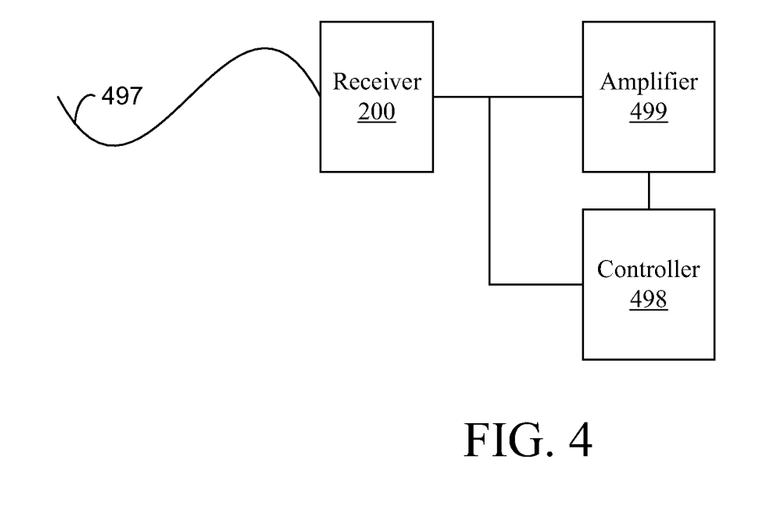
FIG. 4 depicts exemplary circuitry of the handheld ultrasound detection apparatus such as is depicted in FIG. 1.

FIG. 4 is a block diagram depicting exemplary circuitry structure of the present disclosure. In this regard, an ultrasound signal 497 is received by the receiver 200. The receiver 200 outputs a signal to the controller 499. The controller 499 determines the size of the output signal, and controller the gain of the amplifier 398 based upon the size of the output signal received.

Figure 5:
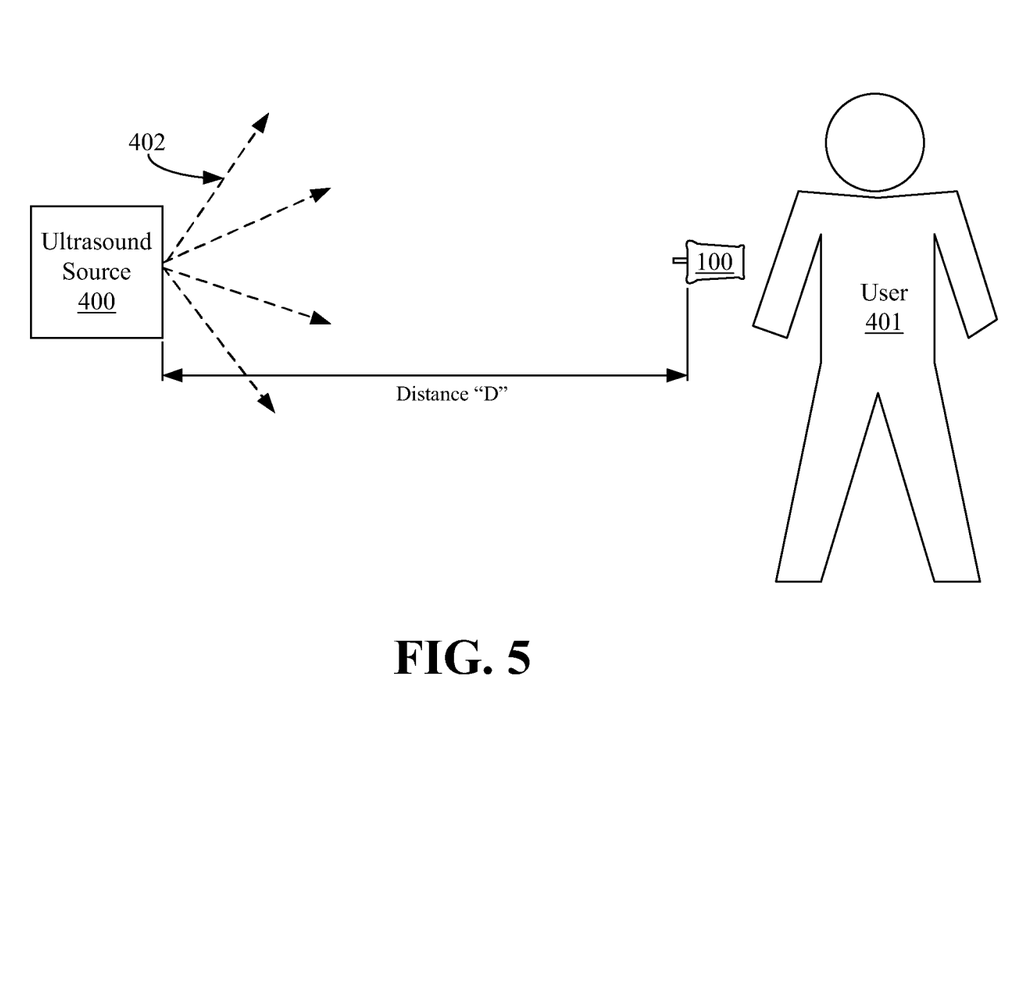
FIG. 5 depicts an exemplary use of the handheld ultrasound detection apparatus depicted in FIG. 1.

FIG. 5 depicts use of the apparatus 100, for example in the field of maintenance. Notably, a user 401, e.g., a maintenance technician, may desire to determine if there is a leak in the vicinity of the user 401. The user 401 activates the handheld ultrasound detection apparatus 100 via the "On" button 102 (FIG. 1).

Upon activation, the receiver 202 (FIG. 2) begins receiving data indicative of ultrasound from the vicinity. Thus, there can be a sound source 400 within the vicinity of the user 401 emitting ultrasound signals 402. The sound source 400 can be, for example, a transmitter that has been placed within a closed container to enable detection of leaks in the container. In addition, the sound source 400 can be a leaking pipe or an electrical box wherein a connection is experiencing corona discharge.

The detector 205 (FIG. 2) in the apparatus 100 can determine the distance "D" between the ultrasound source 400 and the user 401 by receiving light reflected off an object from the laser 202 (FIG. 2). The detector 205 receives reflected light from the laser 202. The distance "D" is displayed via the display device 101 (FIG. 1).

Based upon data displayed by the display device 101 (FIG. 1), the user 401 can determine whether there is a signal being received indicative of a leak, e.g., in the 40K Hertz range. In addition, the user 401 can also wear the listening device 308 (FIG. 3), and determine, based upon what he hears, whether there is a notable signal in the vicinity. If the user 401 is unsure about the nature of the sound that he hears, the user 401 can select to hear, e.g., a sample air leak from the sound byte data 222 (FIG. 3) and audibly compare what he is hearing with the sounds stored in memory 302.

Figure 6:
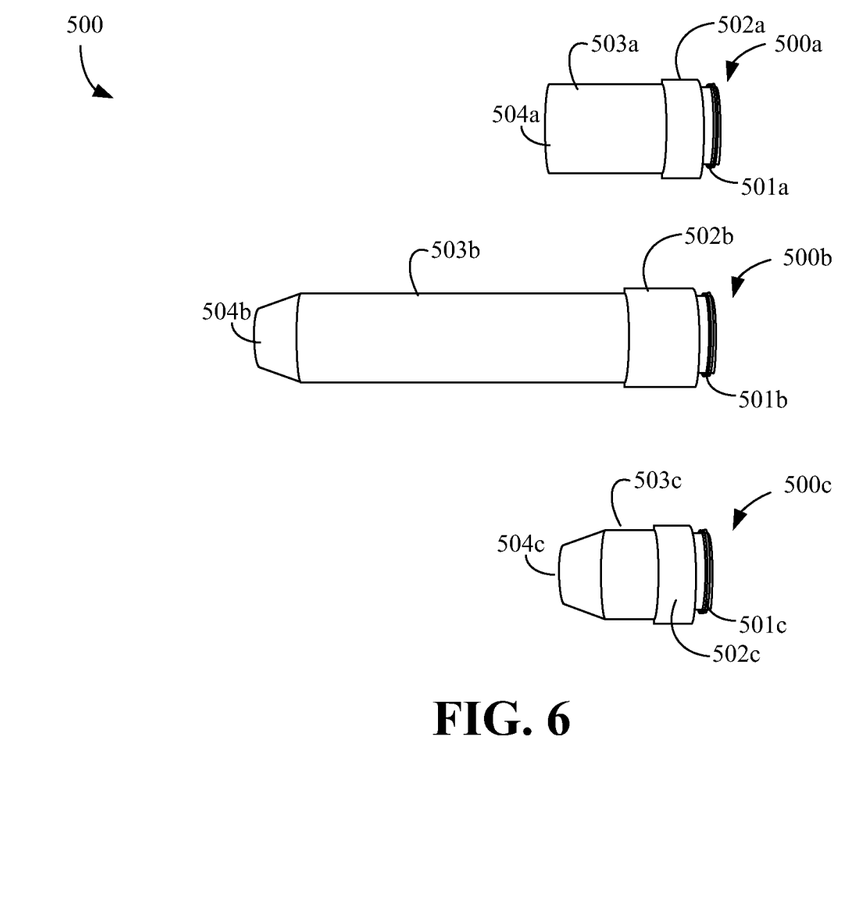
FIG. 6 depicts three exemplary embodiments of receiver heads for the handheld ultrasound detection apparatus, such as is depicted in FIG. 1.

FIG. 6 depicts three exemplary embodiments 500a, 500b, and 500c of receiver heads that can be connected to the threaded cylindrical structure 201 (FIG. 2). The receiver heads 500a, 500b, and 500c connect to the threaded cylindrical structure 201 (FIG. 1) on the apparatus 100 (FIG. 1) and facilitate reception of ultrasound signals (not shown). In this regard, the receiver heads 500a, 500b, and 500c extends the "reach" of the apparatus 100. Each receiver head 500a, 500b, and 500c is hollow having an open at their ends, i.e., at the distal end of the receiver heads 500a, 500b, and 500c.

The receiver head 500a comprises a threaded end 501a, a gripper portion 502a, a shaft 503a, and a receiving end 504a. In this embodiment, the threaded end 501a comprises a male thread that mates with the female threaded cylindrical structure 201 (FIG. 1). The gripper portion 502a comprises a raised generally rough surface that is easily grippable by the user's fingers to install and remove the receiver head 500a from the apparatus 100.

The shaft 503a is a generally cylindrical extender with a hollow, generally cylindrical bore and is integrally formed with the threaded end 501a, the gripper portion 502a, and the receiving end 504a. In one embodiment, the shaft 503a is one and one-half (1½) inches long with a hollow bore. In other embodiments, other dimensions can be used. The shaft 503a may be fabricated from stainless steel or other rigid materials. In one embodiment the shaft 503a is fabricated from a non-conductive material such as Delrin so as to avoid arcing when testing for corona discharge of electrical circuits or in electrical panels.

In another embodiment, the shaft 503a and/or the receiving end 504a is fabricated from a magnetic material. A magnetic receiving end 504a may be desirable when testing certain components, such as bearings, because the end 504a is attracted to and may temporarily affix to the jacket of the bearing. While the end 504a is temporarily affixed to the component under test, the sound quality may be greater and the incidence of undesirable sounds being received may be decreased.

The receiving end 504a is open-ended for pointing at and receiving ultrasonic signals. The receiving end 504a is a generally straight cylindrical end. As discussed below with respect to the receiving end 504b, other embodiments have tapered ends.

The receiver head 500b comprises a shaft 503b that is longer than the shaft 503a of the receiver head 500a. A longer shaft may be desirable, for example, when testing for leaks among a plurality of pipes in a small area. In this regard, the elongated shaft 503b may fit in amongst multiple pipes to test around joints and seals. In one embodiment, the shaft 503b is five inches in length, though other lengths could be used.

The receiver head 500b further comprises a tapered receiving end 504b. The tapering of the receiving end 504b serves the purpose of narrowing the end to enable it to squeeze into tighter spaces. The tapering further serves to funnel the ultrasonic signals into the receiver 200 and also reflects undesirable signals away from the receiver head 500b.

The receiver head 500c also comprises a tapered receiving end 504c. The receiving end 504c is integrally formed with the elongated shaft 503c and a gripper portion 502c.

Each of the receiver heads 500a, 500b, and 500c essentially extend the reach of the receiver 200 contained handheld ultrasound detection apparatus 100. In this regard, the receiver heads 500a, 500b, and 500c are such that input is more focused in the direction at which the receiving end is pointed. Thus, the ultrasound energy received by the receiver 200 has a more pronounced effect because the ultrasound energy is directed at the receiver 200 by the receiver heads 500a, 500b, and 500c.

Figure 7:
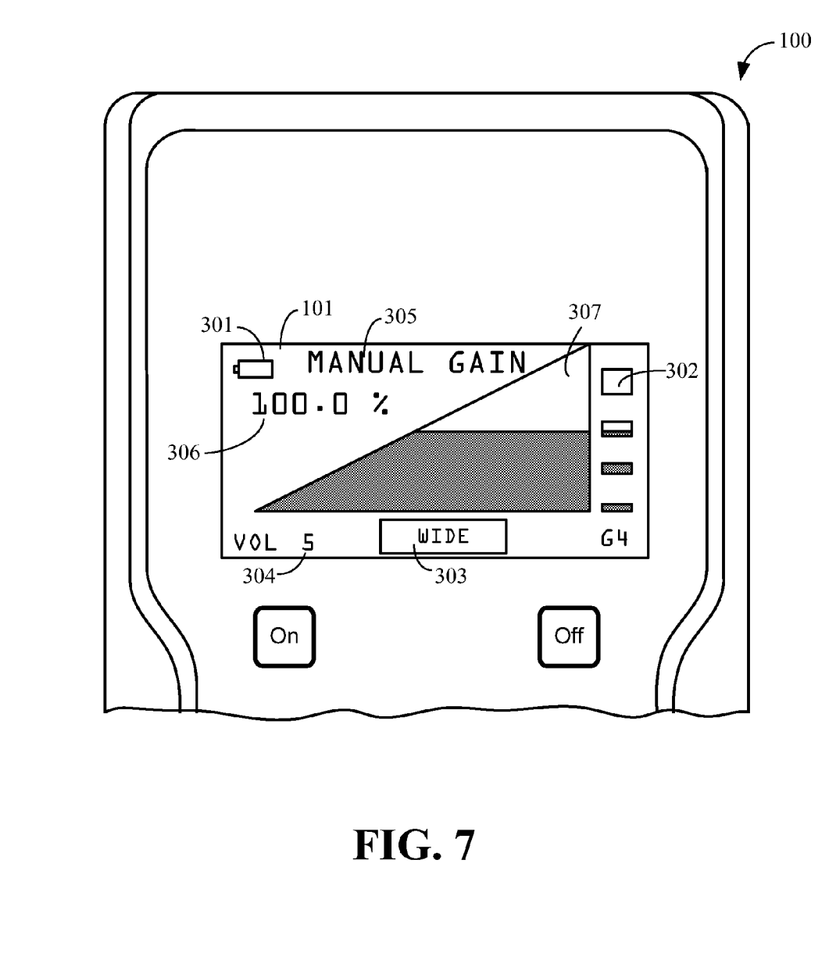
FIG. 7 depicts an exemplary display device of the apparatus depicted in FIG. 1.

FIG. 7 depicts an exemplary display device 101 according to an embodiment of the apparatus 100. The display device 101 comprises a battery level indicator 301 which displays graphically the general amount of battery power remaining. Display device 101 further comprises a volume indicator 304 which displays the current volume setting of the apparatus 100. A mode indicator 303 displays whether the apparatus 100 is in Wide or Narrow mode. Signal intensity bars 302 and a signal intensity window 307 display graphically the intensity level of a signal received.

The display device 101 further comprises a saturation level indicator 306 that indicates the saturation level of the electronics. The display device 101 further comprises a mode indicator 305 that indicates that the apparatus 100 is in "Manual Gain" mode.

Figure 8:
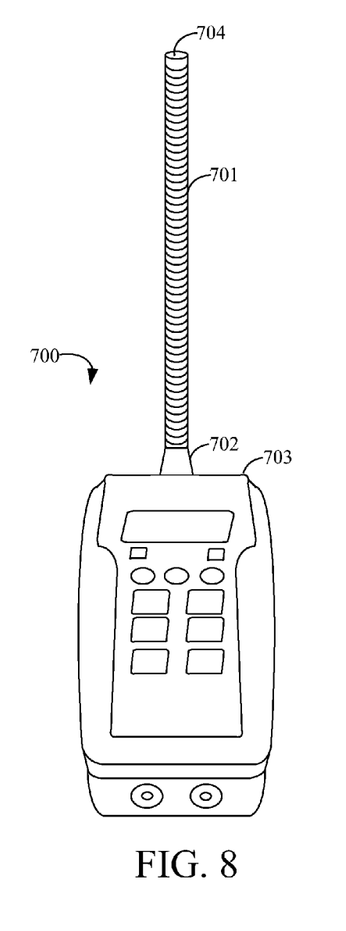
FIG. 8 depicts a front bottom perspective view of a handheld ultrasound detection apparatus having a flexible tube in accordance with an embodiment of the present disclosure.

FIG. 8 depicts a back end perspective view of a handheld ultrasound detection apparatus 700 in accordance with another embodiment of the present disclosure. In such an embodiment, the handheld ultrasound detection apparatus 700 comprises a housing 703. The handheld ultrasound detection apparatus 700 further comprises a flexible tube 701 connected at its proximal end to the housing 703.

Notably, the handheld ultrasound detection apparatus 700 is substantially similar to the leak detection device 100 depicted in FIG. 2. In this regard, the flexible tube 701 comprises a base 702, and there is a receiver (not shown), similar to the receiver 200 (FIG. 1) within the base 702.

In one embodiment, the base 702 may comprise threading. In such an embodiment, the flexible tube 701 may also comprise threading (not shown), and the flexible tube 701 is threadedly coupled to the base 702. In other embodiments, the flexible tube 701 may be attached to the housing 703 in other ways, for example, the flexible tube 701 may be permanently mounted to the base 702 via a weld.

During use, the receiver (not shown) receives sound waves that travel through the flexible tube 701. Notably, when an opening 704 of the flexible tube 701 is pointed in a direction of a sound, the sound waves (not shown) enter the flexible tube 701 through the opening 704 and travel through the tube to the receiver. Provision of the flexible tube 701 tends to decrease the effect of ambient noise when a user (not shown) is attempting to locate a source (not shown) of a particular sound.

Figure 9:
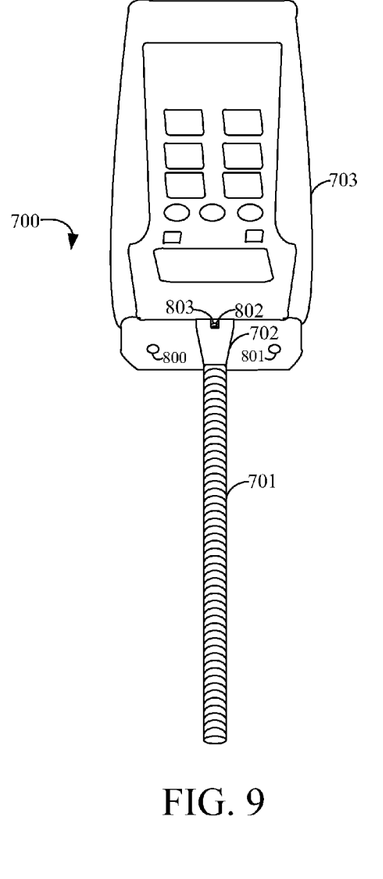
FIG. 9 depicts a front top perspective view of the handheld ultrasound detection apparatus of FIG. 7.

FIG. 9 depicts a front top perspective view of the handheld ultrasound detection apparatus 700. In this regard, the flexible tube 701 comprises the base 702, and the base 702 is mounted to the housing 703. The apparatus 700 further comprises a laser 803 and a detector 802, which behave similar to the laser 202 (FIG. 2) and detector 205 (FIG. 2), described hereinabove. Such laser 803 and detector 802 are mounted to the housing 703.

In addition, the apparatus 700 further comprises lighting devices 800 and 801, which emit visible light, similar to the lighting devices 203 (FIG. 2) and 204 (FIG. 2) described hereinabove. Such lighting devices 800 and 801 are mounted to the housing 703.

Notably, the flexible tube 701 and the base 702 are mounted below the laser 803/detector 802 combination. In addition, the flexible tube 701 and the base 702 are mounted between the visible lighting devices 800 and 801.

Figure 10:
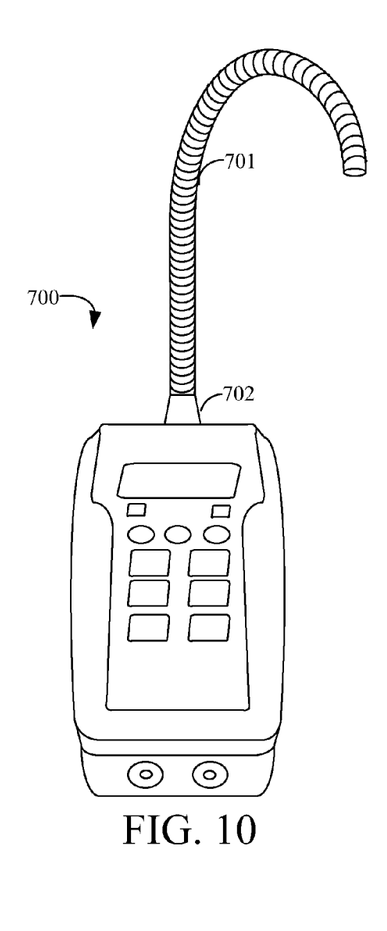
FIG. 10 depicts the handheld ultrasound detection apparatus of FIG. 7 showing a one-way deformation of the flexible tube.

FIG. 10 depicts the apparatus 700 showing the flexible tube 701 in an arc-shape. Such a bend would enable the user (not shown) of the apparatus 700 to detect sound around a corner (not shown), that may otherwise be undetectable. In this regard, such bend in the flexible tube 701 facilitates positioning of the flexible tube 701 around obstacles so that it is better exposed to ultrasound waves.

Figure 11:
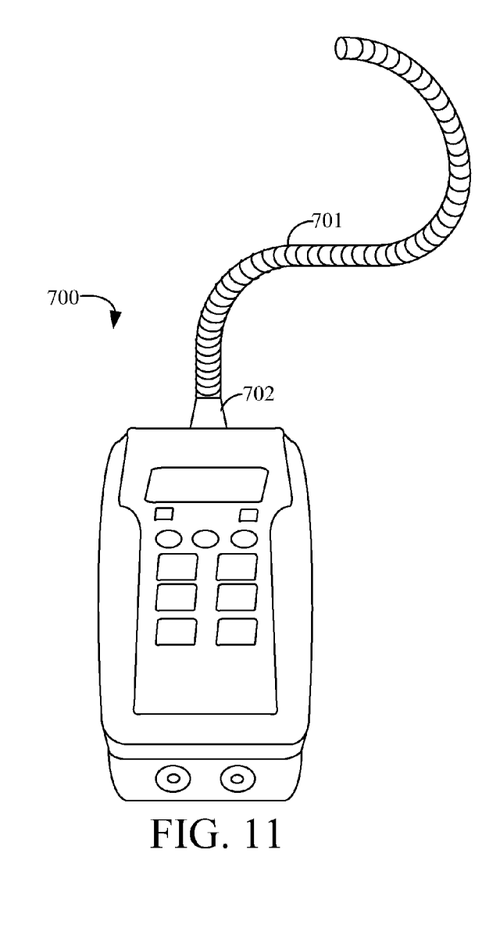
FIG. 11 depicts the handheld ultrasound detection apparatus of FIG. 7 showing a two-way deformation of the flexible tube.

FIG. 11 depicts the apparatus 700 showing the flexible tube 701 further bent in such way as to have to arc-shaped bends. Such bends, again, would enable the user of the apparatus 700 to detect sound in areas that may otherwise be concealed with obstacles. In this regard, such bend in the flexible tube 701 facilitates positioning of the flexible tube 701 around obstacles so that it is better exposed to ultrasound waves.

Figure 12:
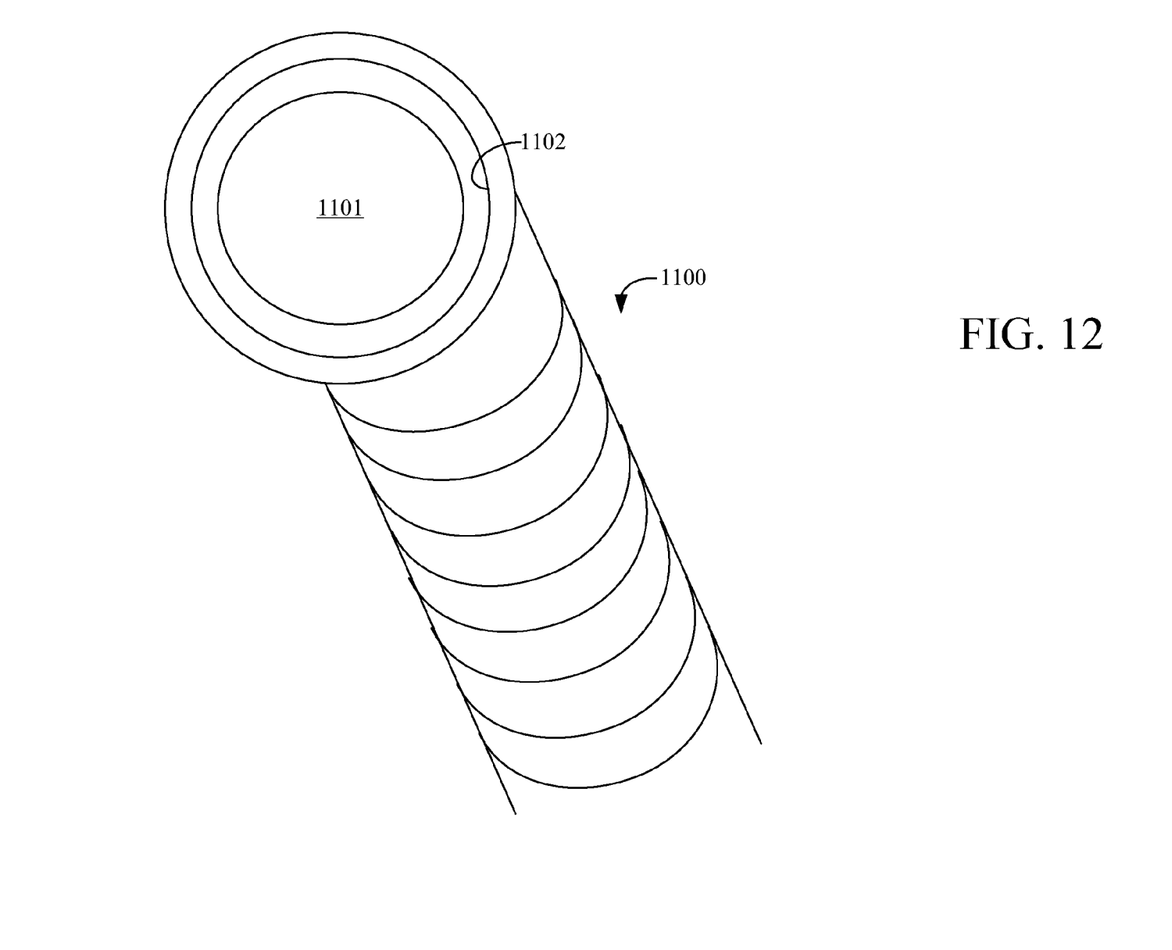
FIG. 12 depicts an exemplary end of a flexible tube having a receiver therein in accordance with another embodiment of the present disclosure.

FIG. 12 depicts a distal end of a flexible tube 1100 in accordance with another embodiment of the present disclosure. In such an embodiment, a receiver 1101 is mounted in an opening 1102 in the distal end of the flexible tube 1100. The mounting of the receiver 1101 in the opening 1102 of the flexible tube 1100 is in contrast to the embodiment described hereinabove wherein the receiver 200 (FIG. 2) is mounted in the base 702 (FIG. 7) that is coupled to the housing 703 (FIG. 7).

In the embodiment described with reference to FIG. 12, wires (not shown) travel through the flexible tube 1100. The wires are then attached to a printed circuit board (not shown) within the handheld ultrasound detection apparatus 700.

Figure 13:
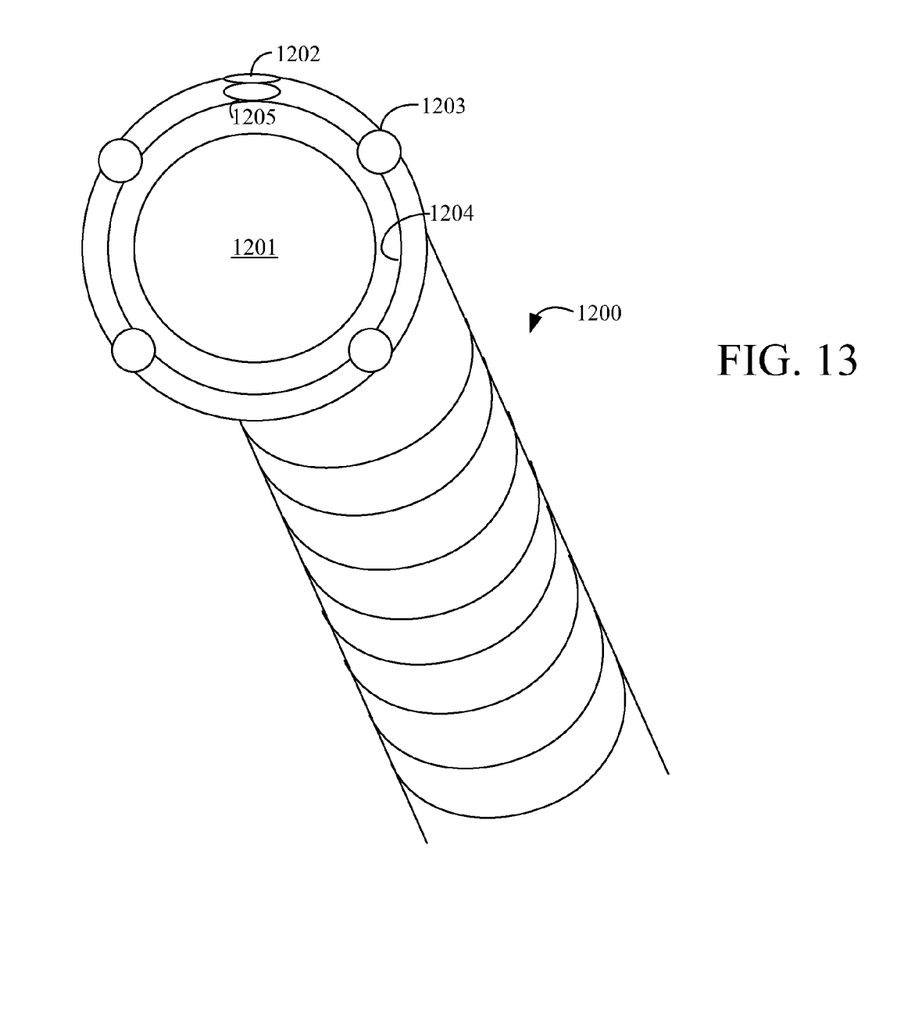
FIG. 13 depicts another exemplary end of a flexible tube having a receiver, a laser light, and a plurality of visible lights in accordance with another embodiment of the present disclosure.

FIG. 13 depicts a flexible tube 1200 in accordance with another embodiment of the present disclosure. In such an embodiment, a receiver 1201 is mounted in an opening 1204 in the flexible tube 1200 similar to the flexible tube 1100 (FIG. 12). In addition, however, the flexible tube 1200 further comprises a laser 1202 and a detector 1205, which operate similar to the laser 202 (FIG. 2) and the detector 205 (FIG. 2) described hereinabove. Also, the flexible tube 1200 comprises a plurality of visible lighting devices 1203.

The invention claimed is:

1. A handheld ultrasound detection apparatus, comprising:
a housing comprising a display device;
a base located on a front end of the housing;
a laser located adjacent to the base;
a detector located adjacent to the laser;
one or more visible lights located on the front end of the housing;
a flexible tube attached at its distal end to the housing, the flexible tube housing an ultrasound receiver for receiving ultrasound energy and converting the ultrasound energy into an electronic signal, wherein the ultrasound receiver is coupled to the distal end of the flexible tube such that the ultrasound signal travels through the flexible tube to the receiver; and
logic configured to
receive the electronic signal and convert the electronic signal to digital data,
display data indicative of the digital data to the display device, and
calculate the distance between the housing and an object at which the laser is pointed based upon light transmitted by the laser, reflected from the object, and received by the detector.

2. The handheld ultrasound detection apparatus of claim 1, wherein the logic is further configured to display the distance of the object to the display device.

3. The handheld ultrasound detection apparatus of claim 1, wherein the base comprises a threaded opening.

4. The handheld ultrasound detection apparatus of claim 3, wherein the flexible tube comprises a threaded protrusion.

5. The handheld ultrasound detection apparatus of claim 4, wherein the threaded protrusion of the flexible tube is threadedly coupled to the threaded opening of the base.

6. The handheld ultrasound detection apparatus of claim 1, wherein the flexible tube is welded to the base.

7. A handheld ultrasound detection apparatus, comprising:
a housing comprising a display device;
one or more printed circuit boards disposed within the housing;
a flexible tube attached at its distal end to the housing;
an ultrasound receiver coupled to a proximal end of the flexible tube, said receiver for receiving ultrasound energy and converting the ultrasound energy into an electronic signal, wherein at least one wire travels through the flexible tube to at least one of said printed circuit boards;
a laser located on the proximal end of the flexible tube and connected to at least one of said printed circuit boards by one or more wires traveling through the flexible tube;
a detector located adjacent the laser on the proximal end of the flexible tube; and
logic configured to
receive the electronic signal and convert the electronic signal to digital data,
display data indicative of the digital data to the display device, and
calculate the distance between the housing and an object at which the laser is pointed based upon a laser pulse transmitted by the laser and light reflected from the object and received by the detector.

8. The handheld ultrasound detection apparatus of claim 7, wherein the logic is further configured to display the distance of the object to the display device.

9. The handheld ultrasound detection apparatus of claim 7, further comprising a base on a front end of the housing, wherein the base comprises a threaded opening.

10. The handheld ultrasound detection apparatus of claim 9, wherein the flexible tube comprises a threaded protrusion.

11. The handheld ultrasound detection apparatus of claim 10, wherein the threaded protrusion of the flexible tube is threadedly coupled to the threaded opening of the base.

12. The handheld ultrasound detection apparatus of claim 7, wherein the flexible tube is welded to a base on the front end of the housing.

* * * * *